United States Patent [19]

Kasmark, Jr. et al.

[11] Patent Number: 5,124,177

[45] Date of Patent: Jun. 23, 1992

[54] FILTER AND METHOD OF MAKING SAME

[75] Inventors: James W. Kasmark, Jr.; Joseph B. Brown, both of Mt. Clemens, Mich.

[73] Assignee: D-Mark, Inc., Mt. Clemens, Mich.

[21] Appl. No.: 485,895

[22] Filed: Feb. 10, 1990

Related U.S. Application Data

[63] Continuation-in-part of Ser. No. 176, May 20, 1988.

[51] Int. Cl.⁵ .............................................. B05D 1/12
[52] U.S. Cl. .................................. 427/202; 427/244; 118/63
[58] Field of Search .................... 427/202, 244; 118/63

[56] References Cited

U.S. PATENT DOCUMENTS

| | | | |
|---|---|---|---|
| 1,505,694 | 8/1924 | Bentel | 118/63 |
| 2,668,787 | 2/1954 | Schramm | 427/202 X |
| 2,698,260 | 12/1954 | Meauze et al. | 118/63 X |
| 2,930,104 | 3/1960 | Watts et al. | 427/202 X |
| 3,019,127 | 1/1962 | Czerwonka et al. | 427/202 |
| 4,336,038 | 6/1982 | Schultheiss | 55/274 |
| 4,699,681 | 10/1987 | Kasmark et al. | 427/202 |

FOREIGN PATENT DOCUMENTS

548254 11/1957 Canada .................... 427/202
2032298 5/1980 United Kingdom .

Primary Examiner—Shrive Beck
Attorney, Agent, or Firm—Brooks & Kushman

[57] ABSTRACT

An odor-removing filter approaching the carbon-particle loading of a filled filter may be formed by spraying or roll coating the adhesive against one or more faces of a porous, fibrous, air-permeable mat, depositing carbon particles or other odor-removing particles of a size to compliment the void size of the mat on the adhesive coated face or faces of the mat and then driving the particles into the mat and thereafter curing the adhesive to lock the particles into the mat. The adhesive bond of the particles to the mat is improved by working the particles against the adhesive-coated fibers. An overspray of an adhesive may also be utilized to further improve the retention of the particles. So-called "clean filters" may be produced according to the method disclosed, wherein a white, fibrous mat has carbon particles loaded on one face while the opposite face appears white or "clean". An indicator filter notifying the user when the filter becomes grease laden may also be formed following the methods used herein.

24 Claims, 5 Drawing Sheets

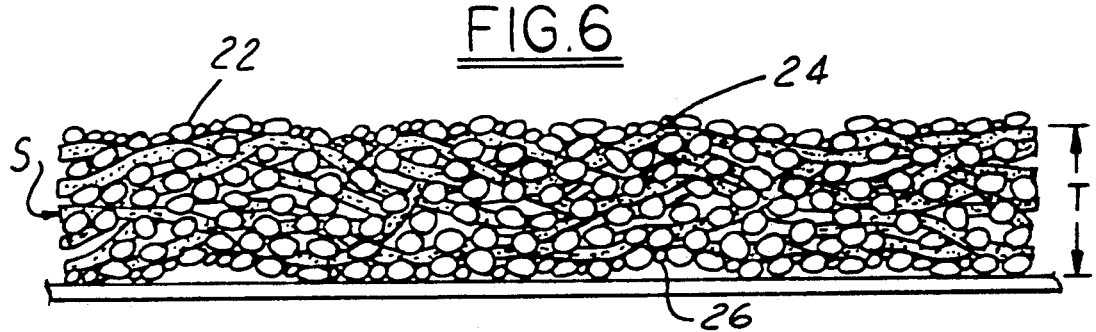
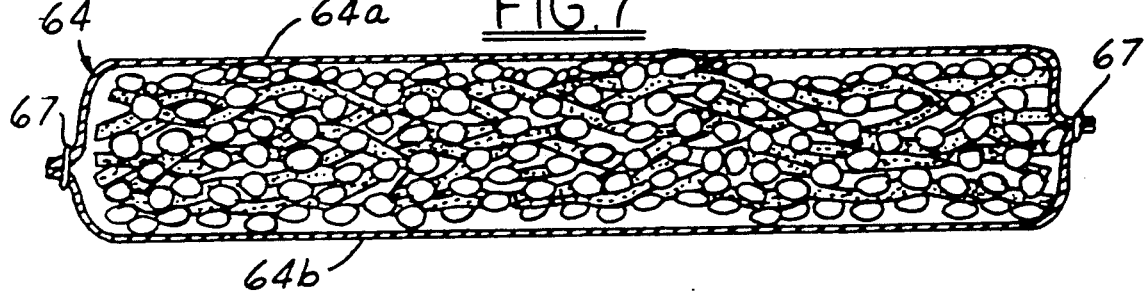
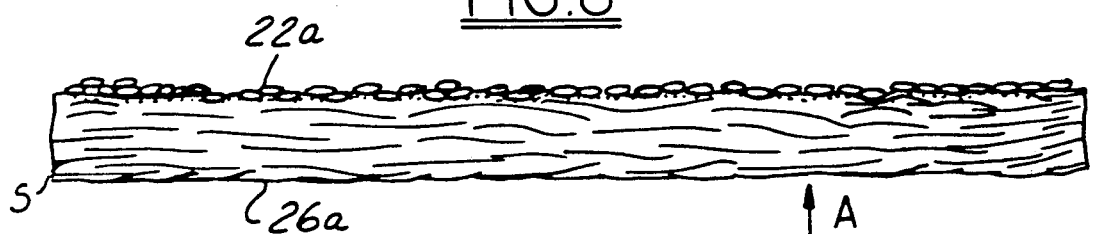
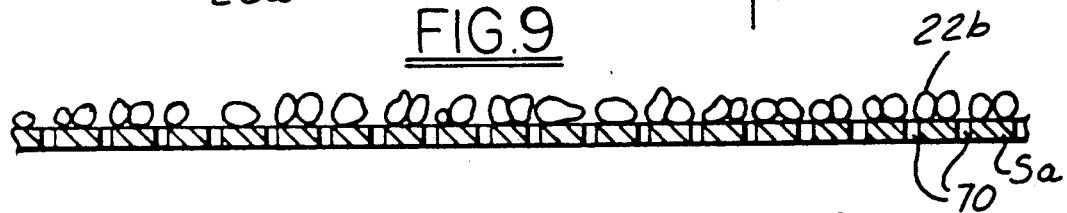
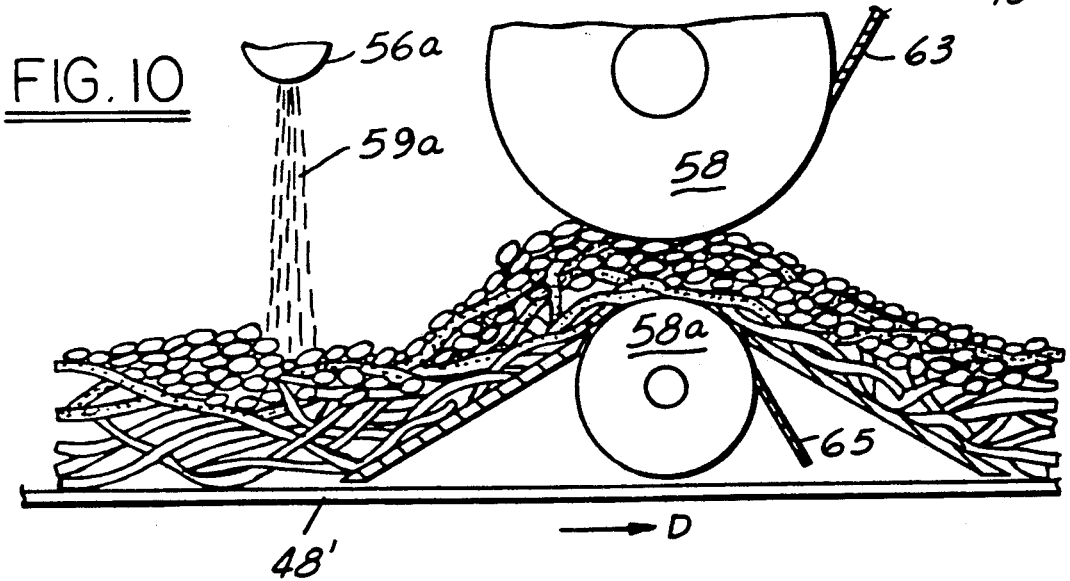

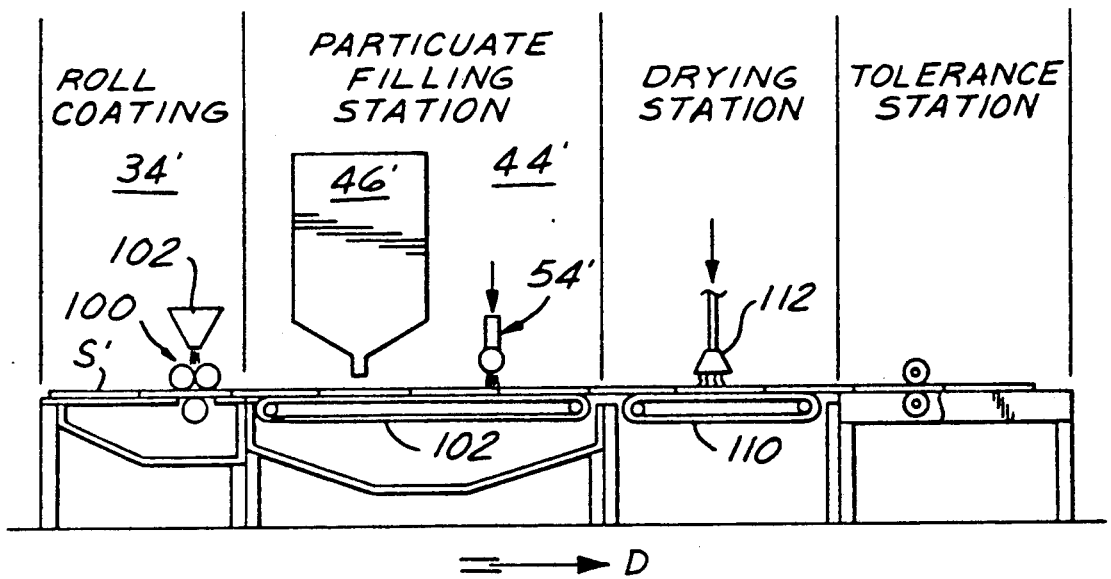
FIG. 16
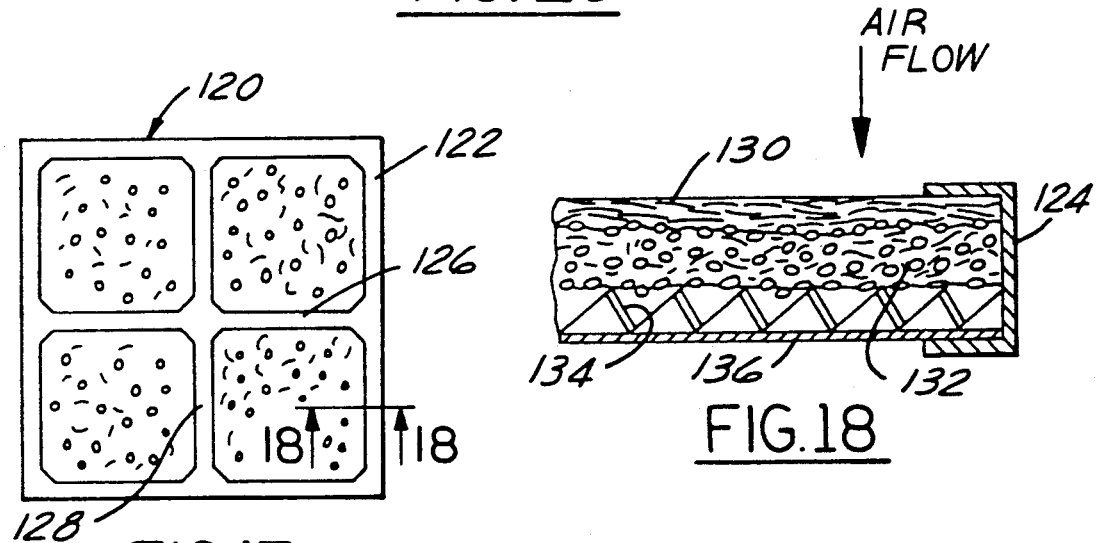
FIG. 17
FIG. 18
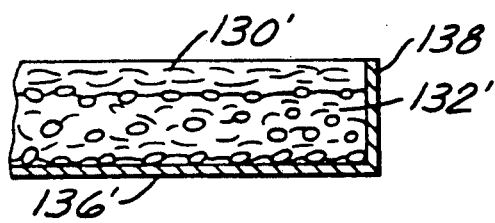
FIG. 19
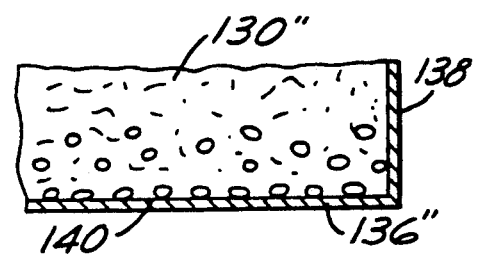
FIG. 20

FILTER AND METHOD OF MAKING SAME

RELATED APPLICATIONS

This application contains the disclosure of U.S. application Ser. No. 000,176 field 20 May 1988 and is a continuation-in-part thereof.

FIELD OF INVENTION

This invention relates to odor-removing filters and the disclosure incorporates by reference the disclosure of U.S. Pat. No. 4,227,904, and U.S. Pat. No. 4,699,681.

BACKGROUND OF INVENTION

In U.S. Pat. No. 3,019,127 a glass fibrous mat made of fibers measuring from approximately 20-25 microns is sprayed with an adhesive, carbon particles of 12 to 50 mesh are sprinkled on the pad, the pad vibrated to distribute the particles and the adhesive cured to adhere the particles in the mat. The method results in a relatively low carbon particle loading, i.e., on the order of 4 percent of particulate material per unit volume of pad. In U.S. Pat. No. 4,227,904, carbon particles measuring 12/28 to 4/6 (Tyler Screen Series) are glued to the face of a perforated substrate to provide a layer of particles on the substrate. This results in a medium loaded product. A highly loaded, thin-bed filter has been made by D-Mark, Inc. of Mt. Clemens, Mich. and others wherein the space between two perforated sheets is filled with loose carbon particles. This results in a high capacity filter, but the particles tend to settle resulting in channeling and shedding of carbon dust. As used herein, the term thin-bed filter refers to a filter having a bed or substrate measuring in thickness anywhere up to two inches.

It has been a long-sought objective to provide an odor-removing thin-bed filter with reasonably high carbon loading, low carbon shedding and no induced channeling at a low unit cost. In some instances, as for the commercial/industrial filter market, a highly efficient, high-capacity filter is desired, while for the range hood and appliance markets a somewhat less efficient and lower capacity filter may suffice. In providing filters for these two markets, allowable pressure drops must be adhered to. For example, in the range hood market, this pressure drop should preferably not exceed 0.15 inches of water column, while in the commercial/industrial market, 0.3 inches is typically allowable.

In the manufacture of the filter according to U.S. Pat. No. 4,227,904, relatively large, odor-removing, pelletized particles are employed such as 6/8 mesh (Tyler Screen Series). This size pelletized material has become difficult to acquire and substitute materials have been difficult to reliably adhere to the filter substrates. As the filter made under U.S. Pat. No. 4,227,904 was particularly adapted for manufacture with the 6/8 pellet, the need has arisen to find other approaches to the manufacture of thin-bed type filters.

In addition, there has been a need to provide a combination odor and grease removing filter that will visually indicate when it has become grease laden and should be replaced.

In seeking to provide suitable filters for both the range hood/appliance and the commercial/industrial markets at the lowest cost, it has become desirable to provide a method of manufacture that utilizes readily available granular carbon and is sufficiently flexible so filters especially designed for these different markets may be produced without requiring separate dedicated production lines. This has lead to the desirability of a filter wherein the odor-removing media is so suspended in the air stream that greater or lesser quantities of the media may be provided (in accordance with the different market requirements) by simple changes in the method of filter manufacture.

SUMMARY OF INVENTION

We have discovered how to provide a filter having carbon particles suspended in the air stream in a quantity approaching that of a conventional filled filter but without the disadvantages associated therewith such as shedding or channeling or the high pressure drop associated with some filled-filter designs. This is accomplished by suspending the carbon particles in a substrate which is formed of a porous fibrous air-permeable mat having a denier of from 3 to 400, spraying the mat with an adhesive sufficient to penetrate as far through the mat as the carbon particles are to be suspended, then depositing carbon on the mat and driving them thereinto and thereafter curing the adhesive to lock the particles in the substrate. If desired, the odor-removing particles may extend completely through the thickness of the substrate.

We have found that the particles may be more effectively locked in the substrate, in some cases, by applying a second coating of adhesive thereto. In addition the thickness of the final substrate may be controlled by passing it through sizing rollers. We have also discovered that a substantial improvement in the state of the art may be provided by matching the particle size to the void size in the substrate. For example, a larger denier, more open mat may be filled with larger particles whose size tend to fill the voids between the fibers of the mat. We have further found that the effectiveness of the adhesive bond may be improved by working the particles against the adhesive-coated fibers. Techniques for effecting such working are disclosed.

Methods of making thin-bed type filters which are capable of producing a more heavily loaded filter than that shown in U.S. Pat. No. 3,019,127 or a more uniform and more securely attached carbon layer than that in U.S. Pat. No. 4,227,904, are herein disclosed. In addition, a basic design concept for the filter enables manufacture of filters for both the range hood/appliance market and the commercial/industrial markets utilizing the same production line with simple changes to accommodate the particular end result desired. According to the method, a porous substrate is coated on one or both sides by an adhesive spray, odor-removing particles are deposited on one or both sides and then driven into the substrate, the adhesive is cured and the carbon loaded substrate is assembled into a filter. Following the teaching herein, utilizing 6/12 carbon particles in a 250 denier unwoven polyester mat (substrate) carbon loadings approaching one pound per square foot in a ½ inch thick finished substrate have been achieved. This is believed to be substantially greater than any loading heretofore achieved in the prior art. The odor-removing particles are driven into the substrate either by application of an air stream impinging on the particles and driving them into the substrate, or they may be pressed into the substrate through the application of a roller pressing against them or by a combination of an air stream and a roller. Pressing of the odor-removing particles into the substrate by the roller has been found to improve the adhesive retention of the particles in the substrate. Excess particles are removed from the substrate by application of an air stream directed against them.

Where it is desired to further improve retention of the odor-removing particles in the substrate, the substrate may be sprayed with a second adhesive coat (overcoat) before the substrate is passed through the curing stage to cure the adhesive thereon. This second coat of adhesive spray serves to lock the odor-removing particles in the substrate. The second coat follows driving of the particles into the substrate and/or removal of excess particles from the surface of the substrate.

The adhesive is cured as by passing the substrate through an oven. Adjacent the outlet of the oven, the thickness of the substrate may be sized by passing the substrate between sizing rollers.

Where both sides of a substrate are to be filled with the odor-removing particles, the process is preferably carried out by first coating one side of the substrate, depositing the odor-removing particles thereon and driving them thereinto, removing excess particles and then curing the adhesive. Thereafter the process is repeated on the opposite side of the substrate.

A so-called "clean" filter may be produced according to the method herein disclosed. A white fibrous mat may have one side sprayed with adhesive and the odor-removing particles deposited thereon and partially driven thereinto, excess particles removed, and the adhesive cured. This will result in a filter pad having one side which is white or "clean" while the opposite face is covered by the odor-removing particles. By placing such a substrate in a filter assembly so that the white side is exposed to view, a particle-removing filter having an odor-removing capability is provided.

Another type of so-called "clean" filter which is also an "indicator" filter may be provided by coating one side of a light colored or white fibrous substrate with an ink pattern according to the teaching of German Patent 27 08 435. The printed surface of this substrate is then coated with an adhesive spray insoluble with respect to the aforesaid ink, and odor-removing particles are then deposited on the adhesive-coated surface, and may then be driven into the substrate and the adhesive cured. This will provide a particle and odor-removing indicator filter.

A further filter embodiment made according to the method herein disclosed comprises an expanded metallic layer which has a coating of carbon adhered to the face thereof. The carbon is attached to this substrate following the teachings of the method herein disclosed.

In further experimentation with the methods of filter manufacture here and above mentioned, it has been discovered that effective particle retention in the porous, fibrous air-permeable mat may be accomplished without spraying adhesive on the mat, by roll coating the adhesive onto the mat utilizing a conventional roll coating applicator of the type disclosed in U.S. Pat. No. 4227904. Utilizing a roll coater it has been found that savings on the amount of adhesive required may be effected up to 50% or more as compared with the adhesive used in the spraying techniques herein disclosed. This not only has resulted in substantial cost savings, but obviated problems of water and air pollution and the accompanying health concerns. In addition it has been found that roll coating the adhesive onto the substrate has the effect of working the adhesive down into the substrate and working the adhesive against the fibers of the substrate to assure the coating of them so that the particulate material is better adhered to the fibers.

It has also been discovered that utilizing a roll coating application of adhesive to the substrate and a means for working the particles down into the substrate, such as the air driver or roll driver herein disclosed, the over spray or second spray application of adhesive to the substrate to lock the particles in the substrate is unnecessary. Test have shown that utilizing the roll coating and either the air driver or roll driver, the particles are securely locked as effectively as when the adhesive was applied and then the substrate over coated utilizing adhesive sprays.

In addition it has been discovered that it is unnessary to substantially thoroughly cure the adhesive but rather it is only necessary to cure it sufficiently so that the substrate with it's particulate loading may be handled and to permit the curing to continue as the substrate is further processed, as for example, during packaging and inventory storage or the like.

Where it is desired to fully load a substrate, the adhesive is first applied by the roll coating technique, the particulate media applied to the substrate and worked thereinto by the driver, the adhesive then partially cured to render it non-tacky and handable, the substrate is then inverted and the process repeated on the opposite face. Such will result in loading the substrate completely there through with the odor removing particulate.

It has also been discovered that utilizing the method and structures herein disclosed that filters may be created which are useful for air treatment other than simply odor removal. For example, Zeolite particulate will absorb ethylene and when air is filtered through a substrate loaded with Zeolite in conjunction with the storage of food products, spoilage may be substantially retarded. Similarly, activated Alumina impregnated with potassium permanganate will absorb ammonia and formaldehyde more effectively than will carbon thus utilizing activated Alumina particulates in a substrate of the character herein disclosed will result in a filter that will be very effective in absorbing ammonia and formaldehyde from an air stream passing there through.

BRIEF DESCRIPTION OF THE DRAWINGS

FIG. 6 is a cross-sectional view through a substrate manufactured according to the teaching of FIG. 1 and showing the odor-removing particles extending substantially uniformly through the thickness of the substrate;

FIG. 7 is a cross-sectional view of a substrate as shown in FIG. 6 with the same being enclosed within an air-permeable envelope or scrim; FIG. 8 is a cross-sectional view through what we have termed as a "clean" odor-removing filter;

FIG. 9 is a cross-sectional view through a perforated, self-supporting sheet coated with odor-removing particles according to the method disclosed herein;

FIG. 10 is a cross-sectional view through a substrate being processed through a modified form of the particulate filling station of FIG. 1;

FIG. 16 is a schematic view of a modified form of processing line embodying a modified method described herein;

FIG. 17 is a plan view of a filter structure embodying a further form of the invention;

FIG. 18 is a cross-sectional view taken on the line 18—18 of FIG. 17;

FIG. 19 is a cross-sectional view similar to FIG. 18 but showing a filter structure which is not encased within a filter frame;

FIG. 20 is a cross-sectional view similar to FIG. 18 but showing different form of substrate arrangement and without a filter frame.

BRIEF DESCRIPTION OF THE PREFERRED EMBODIMENTS

In FIG. 6 a porous, air-permeable, non-woven, fibrous substrate S has been filled with odor-removing particulate media 22, adhesively secured in the substrate. The media has been shown as being substantially uniformly distributed over both of the opposed faces 24 and 26 of the substrate and throughout the thickness T of the substrate. The filter of FIG. 6 may find particular utility in industrial or commercial applications where a greater pressure drop can be tolerated and a greater capacity is desired. The process herein disclosed allows for varying the amount of particulate media filling the substrate not only as between a distribution partially or completely through the thickness T, but also as to the density of the loading. For example, in the embodiment of FIG. 6, the filling may be on the order of from 50 grams to 355 grams of particulate per square foot of substrate where the finished substrate is approximately ½ inch thick. The amount of loading depends on variations in the method employed in the manufacture as well as the particulate size and the character of the substrate. As much as 1 pound (454 grams) of particulate per square foot of substrate (nominally ½" substrate thickness) has been achieved and up to about 500 grams appears feasible. Comparing particulate loading of the filter of FIG. 6 with the loading of a filled filter of comparable thickness, between 75 percent to 80 percent by weight has been achieved in pre-production testing. A very light weight filter may be made utilizing a light denier fibrous, non-woven mat of, for example from 3 to 100 denier and a density of from 1 to 6 ounces per square yard. Filling may utilize odor removing media on the order of 20/50 carbon (U.S. Mesh) to −400. The percent of loading may lie in the range of from 8.8% by volume to 88%.

Figure 5:
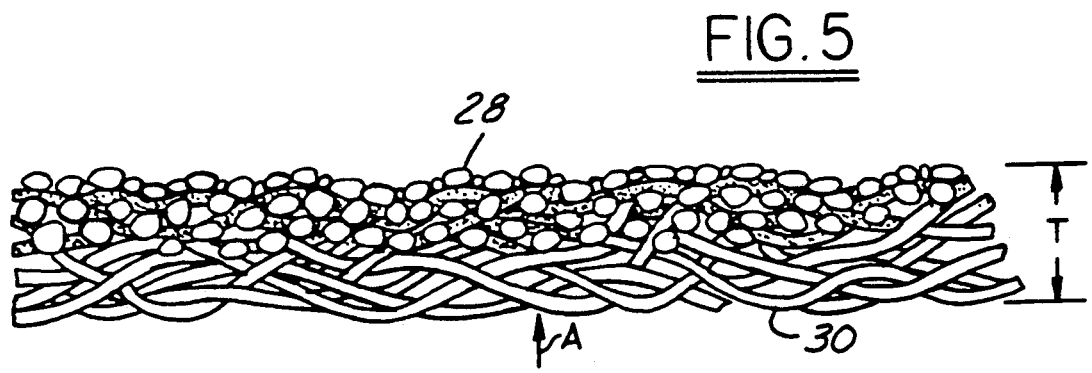
FIG. 5 is a cross-sectional view through a substrate having the odor-removing particles extending substantially half-way therethrough and manufactured according to the method shown in FIG. 1.

In preparing a filter such as shown in FIGS. 5 and 6, a non-woven fibrous mat substrate having a fiber denier of from 3 to 400 may be utilized. For example, a 250 denier fiber with a nominal thickness of ½ inch and a weight of 10 to 28 grams per square foot is placed on the upstream end 32 of a conveyor line shown in FIG. 1 with one of the opposed faces disposed upwardly. Mats move along the line in the direction of arrow D passing through a series of stations where various steps in the method of manufacturing the filter are performed. The first station is the spraying station 34. It comprises a water trough 36 containing an adhesive entraining water bath disposed below adhesive spray nozzles 38, which may be model No. 61 manufactured by Binks Manufacturing Co. of Franklin Park, Ill. and which are mounted to reciprocate back and forth across the substrate as it passes through the station. The bath will catch overspray of adhesive. Station 34 also includes a conveyor 40 having an upper run 40' adapted to support the substrate to move it through the station and a return run 40" which dips down into the water bath. The spray nozzles may be housed in a spray booth with a suitable exhaust system (not shown) for removing adhesive aerosols. Adhesive is delivered to the nozzles to emit a spray that will penetrate a substrate to be filled with the odor-removing particulate. For example, at 30-55 PSIG adhesive pressure and 20-65 PSIG air pressure at the nozzles, a conveyor speed of 5-35 feet per minute and the nozzles being disposed approximately 11-12 inches from the mat, the substrate fibers may be wetted with the adhesive to somewhat greater than one-half the thickness of the mat. Depth of penetration of the adhesive into the mat will be dictated by the nature of the filter to be made, i.e., if the odor-removing particulate media is to extend substantially half way through the mat, then the spray should extend at least that far. Where a filter of the nature shown in FIG. 6 is to be manufactured, the spray should extend substantially half way through the thickness of the substrate so that upon inverting the substrate and passing it again through the spray station 34, the opposite face and remaining depth of the substrate may be wetted.

Figure 2:
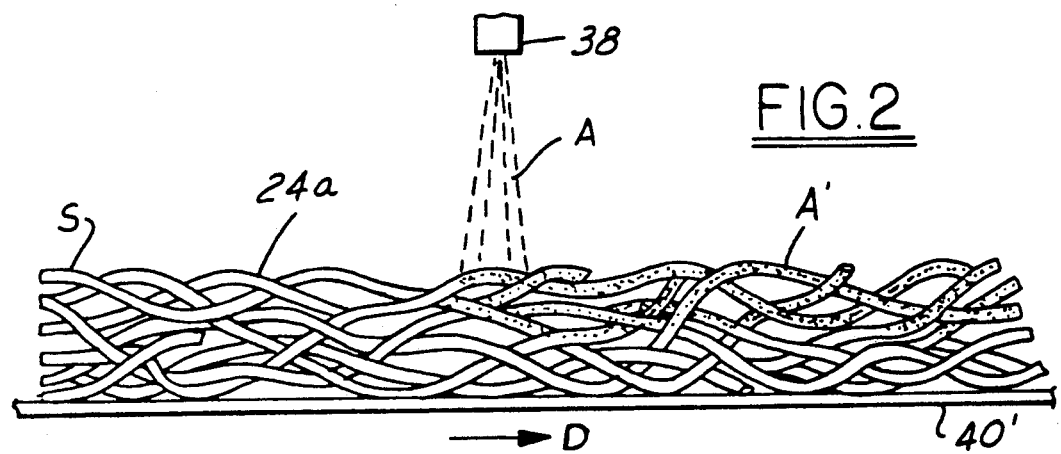
FIG. 2 is a cross-sectional view through a substrate being processed in the spraying station of FIG. 1.

In FIG. 2 the upwardly disposed face 24a, of the substrate S is shown being sprayed with the adhesive A from the spray nozzles 38 which reciprocate back and forth across the substrate. The adhesive is shown at A' on the substrate fibers and as having penetrated substantially one-half the way through the substrate.

Figure 3:
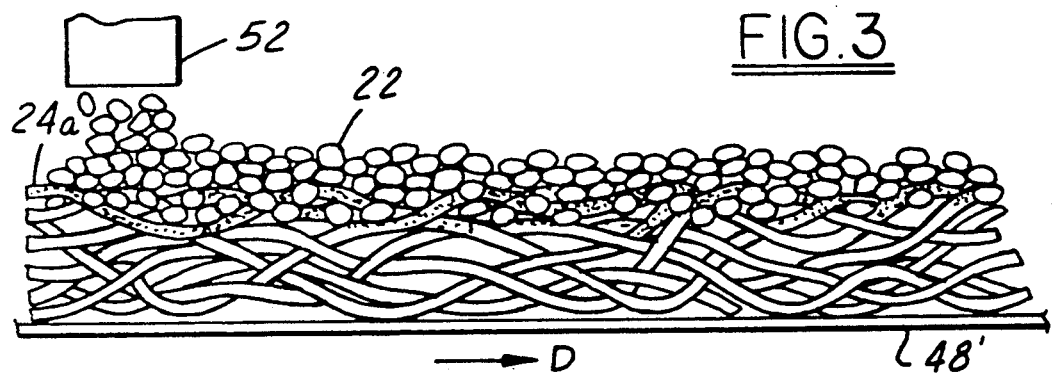
FIG. 3 is a cross-sectional view through a substrate being processed in the particulate filling station of FIG. 1.

Following application of the spray, the substrate S is moved to the particulate filling station 44. Such station comprises a hopper 46 containing the particulate odor-removing media to be loaded into the substrate. A hopper of conventional construction provided with a media discharge slot in its lower end is disposed above substrates passing through the station on the conveyor. The filling station includes its own conveyor 48 which is adapted to receive on its upper run 48' substrates S delivered by the conveyor 40 and moves the substrates through the filling station. Beneath the conveyor 48 is a media catch trough 50 for catching media which is not deposited on or does not remain on the substrates for recycling through the hopper. As the substrates pass beneath the nozzle 52 of the hopper the particulate media is dropped onto the upwardly disposed face of the substrate to uniformly coat the same as the substrate passes beneath. FIG. 3 shows the upwardly disposed face 24a having been loaded with the particulate media from the nozzle 52 of the hopper. Particulate media 22 builds up on top of the substrate as it issues from the nozzle 52 and some of the particulate will sift down into the substrate as shown in FIG. 3 to the right of the nozzle 52. However, for the most part, the particulate will remain essentially on the surface of the substrate. The conveyor 48 has an open substrate supporting surface enabling excess odor-removing particulate to fall through the conveyor to the trough 50.

Figure 1:
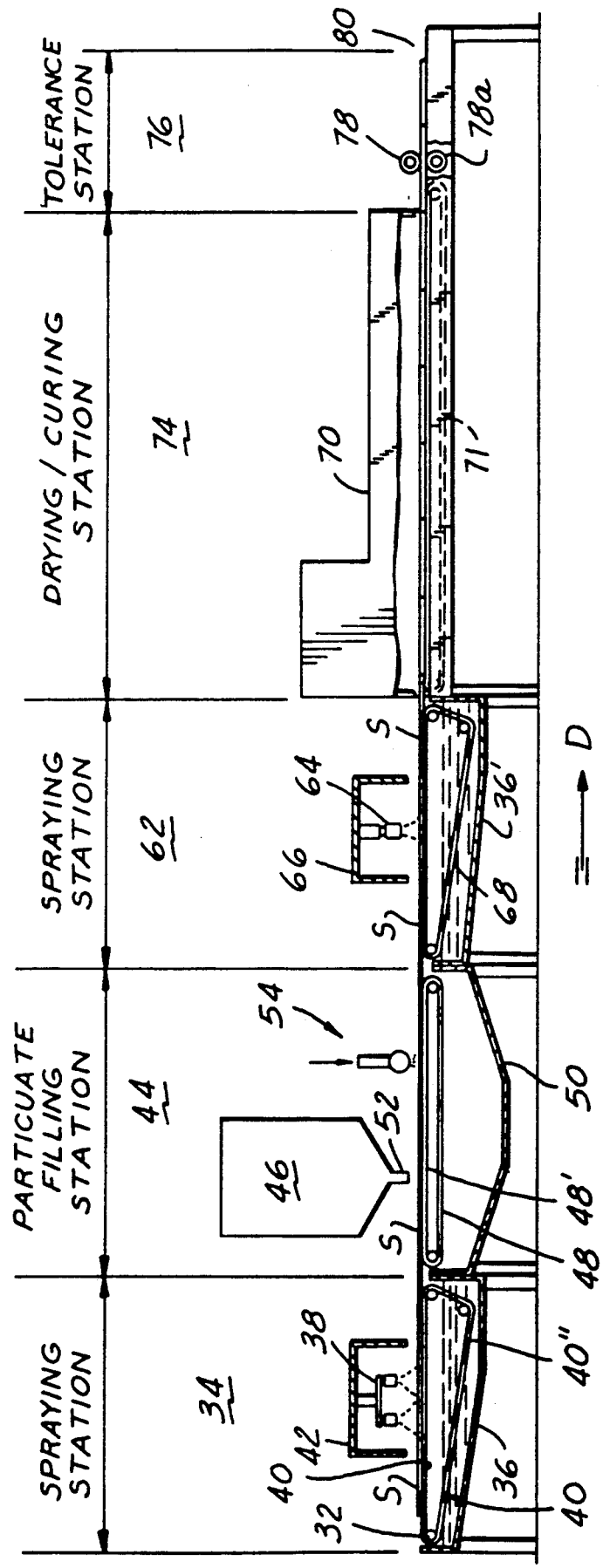
FIG. 1 is a schematic view of a processing line embodying the method described herein.
Figure 11:
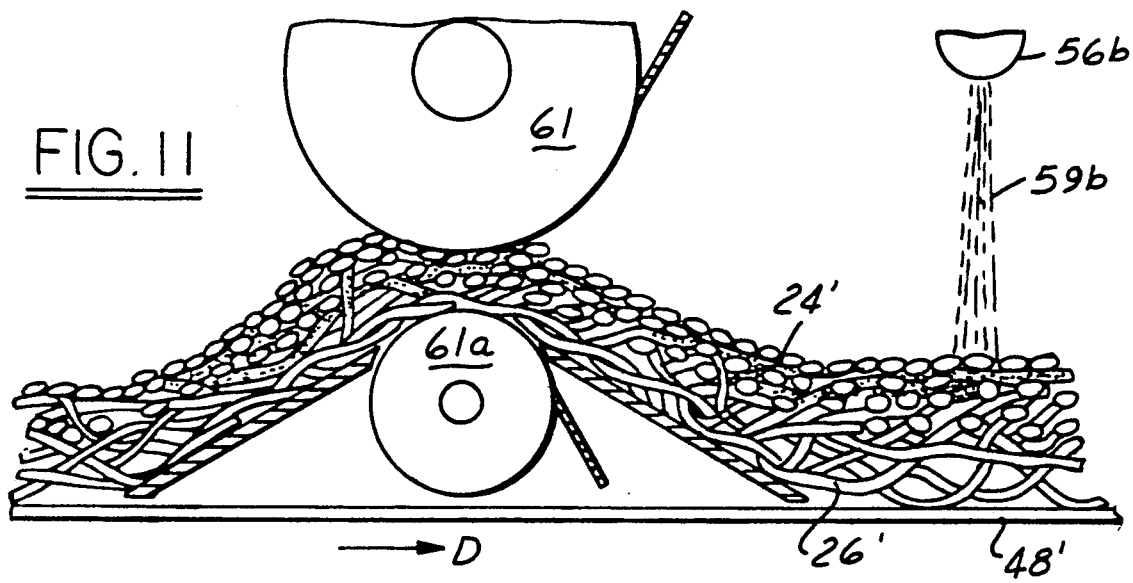
FIG. 11 is a cross-sectional view through a substrate being processed according to a still further modification of the method shown in the particulate filling station of FIG. 1.

Downstream from the nozzle 52 is the particulate driving means generally indicated in FIG. 1 at 54. The particulate driving means is shown in three embodiments in this disclosure, the first being illustrated in FIG. 4 while the second and third are shown in FIGS. 10 and 11 respectively. In each case the function of the particulate driver is to press the particulate media 22 down into the substrate and/or remove excess media from the substrate.

Figure 4:
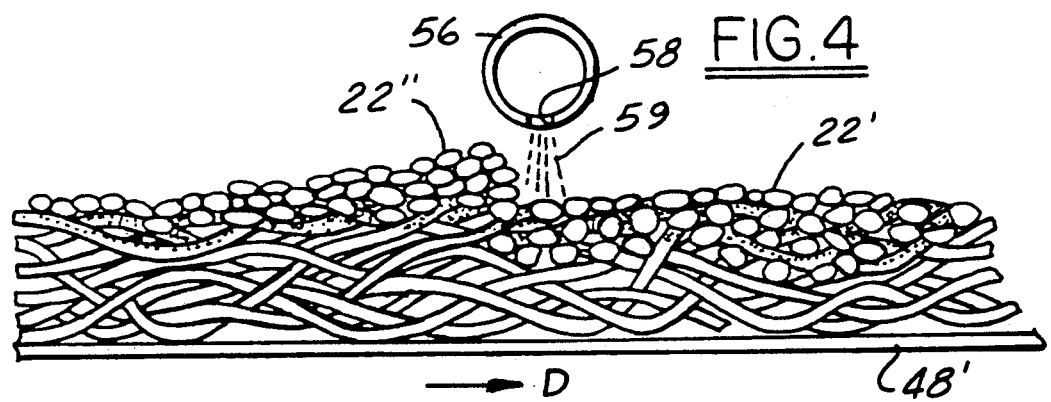
FIG. 4 is a cross-sectional view through a mat having odor-removing particles driven thereinto and excess particles removed therefrom by an air driver.

Turning to FIG. 4 the particulate driver comprises an air pipe 56 which extends transversely of the conveyor 48 in the filling station 44 spaced just above the substrates on the conveyor upper run 48'. The upper run 48' is of a sufficiently open character as to allow air and excess media to pass downwardly therethrough. The air pipe is provided with a series of nozzles 58 which are simply 5/32" openings through the wall thereof disposed at substantially ½-inch intervals. The pipe may be pressurized with a source of compressed air to approximately 60 PSI. This air is delivered from the nozzles and is directed against the substrates passing beneath the air pipe. As the air jets 59 impinge on the particulate media 22, the jets drive the media down into the substrate and also serve to blow off from the top of the substrate excess media. By controlling the force of the jets and the distance of the pipe from the upwardly facing surface of the media coated substrate, the amount of penetration of the particulate into the substrate can be regulated as can the amount of media blown off the substrate. By varying the rotated position of the pipe 56, the amount of odor-removing media blown off the surface of the substrate or driven down into the substrate may be varied. Desirably, the effect of the air driver is regulated so that a substantially uniform layer of particulate media lies on and in the substrate just to the downstream side of the air pipe and excess media which is not in contact with adhesive coated fibers is blown off of the substrate. In FIG. 4 the particulate media 22' is shown at the downstream side of the pipe 56 as generally uniformly covering the upwardly disposed face of the substrate and as having penetrated substantially half the thickness of the substrate. To the upstream side of the air driver, the particulate 22" essentially lies on the upwardly disposed face of the substrate in preparation for being driven thereinto.

In FIG. 4, the air-driver pipe 56 is shown with the jet openings 58 being disposed substantially perpendicular to the substrate passing there beneath. The rotated position of the pipe may be varied.

In FIG. 10 the second form of driver 54 is shown. Essentially it comprises the driver of FIG. 4 designated by reference numeral 56a supplemented at its downstream side by a pair of rollers 58 and 58a. The rollers are mounted in suitable trunions at opposite sides of the conveyor and are driven by a suitable drive mechanism (not shown). The substrates are fed between the rollers. The distance between the rollers is adjustable, but in a preferred embodiment the rollers are adjusted relative to the substrate so as to press substantially halfway down through the substrate. The effect of rollers 58 and 58a, which may be rotated at the same surface speed as that of the conveyor 48 is to press the particulate media down into the substrate. In addition, as the rollers press the media down into the substrate, they work the media against the adhesive coating the fibers and effect a more secure lock of the substrate fibers and the media than simply the air driver alone in FIG. 4. Doctor blades (63 and 65) wipe the surface of the rollers to keep them clear of accumulating adhesive.

In FIG. 11, the third form of particulate driver comprises a pair of driver rollers 61 and 61a of substantially the same character as that shown in FIG. 10 disposed immediately upstream from an air driver 56b. The rollers are arranged to press the particulate 22, which has been deposited by the spout 52 upon the upwardly disposed surface of the substrate S, downwardly into the substrate and embed the same therein. The action of the roller 61 in pressing the particulate media into the substrate also serves to work the media against the adhesive on the substrate fibers to effect a good bond between the fibers and the particulate media. As the substrate passes beneath the air driver 56b downstream of the roller, excess media is blown therefrom. The driver shown in FIG. 11 will serve to embed the greatest amount of particulate media in the substrate as compared with the drivers of either FIGS. 4 or 10.

Downstream of the driver means 54 is a second spraying station 62 for applying a second or "overcoat" on the upwardly disposed face of the substrate. As with the spraying station 34, the second spraying station 62 is provided with a reciprocating sprayhead 64 disposed within a sprayhood 66 and adapted to reciprocate across the substrates as they pass through the station. A conveyor 68 of a construction similar to conveyor 40, and dipping on its return run into a water through 36', serves to transport the substrates through station 62. The purpose of station 62 is to spray the media filled surface of the substrate with a second coating of adhesive to more effectively lock the odor removing media in or on the substrate by providing a coating of adhesive to bridge between the individual media particles and the substrate fibers to bond the same together. This second spraying station is utilized in those instances where it is desired to obtain the most effective locking of the odor removing media on or in the substrate. When the second coat or over coat provided by Station 62 is utilized in combination with the air driver alone, as in FIG. 4, a more secure locking of the media in the substrate is obtained than if the second coat was not applied. This does result in some lessening of the efficiency of the odor removing media, but does not appear to reduce significantly its capacity. If the second coat is omitted, but either the driver of FIG. 10 or the driver of FIG. 11 is utilized, the working of the particulate media effected by the rollers improves the bonding action of the media with the substrate. The bond may not be quite as effective as with the second coating afforded by station 62, but the efficiency of the media is not affected as much. The most secure locking of the media to the substrate is effected by utilizing the second coating provided by station 62 with the driver of either FIGS. 10 or 11.

A substantial advantage of the second coat is in connection with the adhering of smaller size particles to the substrate. We have found that by utilizing the second spray, it may be possible to eliminate altogether the necessity of enclosing the particulate filled substrate in an envelope or scrim to prevent shedding or contamination during handling or use of the filter. We have also found that the second coating is most effective in smaller size particles such as 20/50 (U.S. Screen). As the particle size increases the amount of adhesive that must be applied in the second coat to effect a more secure bond reaches the point where it adversely affects the efficiency of the odor removing particulate.

Downstream from station 62 the substrates pass through a drying/curing station comprising an oven 70 having a conveyor span 71 whose upper run receives the substrates S from station 62 and conveys them through the oven. In the oven the adhesive is cured sufficiently so that upon emerging from the oven the substrates may be handled without the odor removing media dislodging therefrom.

Downstream of station 74 is a tolerance determining or thickness sizing station 76. This station comprises a pair of driven rollers 78 and 78a extending transversely of the conveyor 72 and adapted to receive therebetween the substrates emerging from the curing station and compress the substrates a predetermined amount. The space between the rollers may be adjusted to effectively squeeze the substrates a predetermined amount. As the substrates are hot as they emerge from the oven, the roller will serve to "set" the thickness of the substrates.

Downstream of the tolerance station as at the end 80 of the conveyor, the substrates are successively removed from the processing line for further handling. If it is intended to fill both sides of the substrates, the substrates will be returned to the upstream end 32 and replaced on the conveyor with the unfilled side or face disposed upwardly for passage through the processing line. The steps previously described would then be repeated to provide a substrate which is filled from both sides with the odor removing particles. Utilizing the method heretofore described and passing the substrate through the processing line twice to fill opposite faces 24 and 26 thereof, and using the particulate driver of FIG. 11, it has been possible to provide a loading in a ½ inch nominal final thickness substrate of substantially one pound of activated carbon per square foot of substrate.

In FIG. 7, the substrate S of FIG. 6, has been enclosed within a scrim envelope 64 comprising upper and lower layers 64A and 64B which have been stitched together or otherwise secured around the periphery of the substrate as at 67. The scrim is an open mesh material through which air will readily pass. The function of the scrim is to contain within the envelope carbon which may become dislodged from the substrate. The scrim envelope is particularly useful where the substrate has not been subjected to the overcoat spray of station 62, nor the action of rollers 58 and 58a or 60 and 60a.

Figure 15:
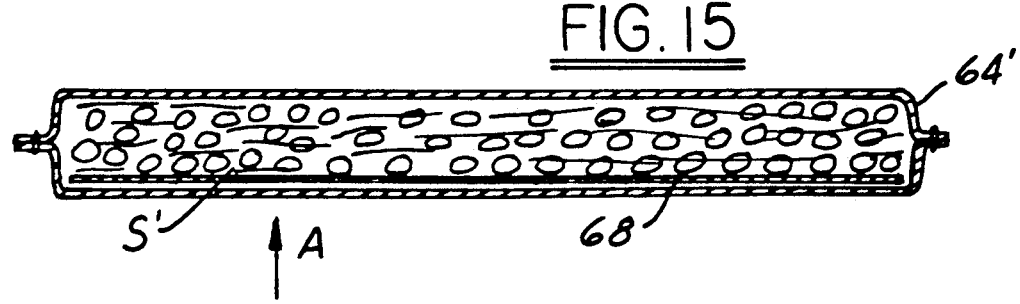
FIG. 15 is a cross-sectional view through a modified form of the filter shown in FIG. 7.

If desired, a layer to filter airborne particles may be disposed inside the envelope to overlie one or both of the faces of the substrate. One such layer is shown in FIG. 15 wherein the filled substrate S' is enclosed within a scrim 64' with a particle filter 68 disposed within the envelope. The intended direction of air flow through this filter is as shown by arrow A. The particle filter pad 68 may be a fuzzy pad that is intended to remove airborne particles before they reach the odor-removing substrate. A suitable pad is sold under the brand name FILTRETE and manufactured by 3M Company of St. Paul, Minn.

In FIG. 8, there is shown what may be termed a "clean" filter. In this embodiment a white (or light-colored) pad or substrate S of approximately ¼ inch thickness of a non-woven, fibrous character having fibers of from 3 to 40 denier and a density of from 2.0 to 6.0 ounces per square yard, is sprayed on one surface with adhesive as in spraying station 34. Odor-removing media, such as activated carbon granules of 20/50 (U.S.) mesh, are deposited on the adhesively-coated face of the substrate. The air driver of FIG. 4 then removes the excess carbon particles to provide a generally uniform layer of carbon particles on the pad approximately one particle thick. The pressure of the air supply to pipe 56 and the direction of the air jets is so controlled that the carbon particles are not driven too deeply into the relatively thin substrate to essentially provide simply a thin coating of the carbon granules on the surface as shown at 22A. The substrate with carbon thereon is then sprayed with a second coating of adhesive in station 62 and then passed through the curing oven to set the adhesive. The substrate would not normally be passed between the tolerance rollers 78 and 78a, but rather would be directly packaged in a supporting frame. Air flow through this substrate would be in the direction of Arrow A in FIG. 8. This filter is intended to be used primarily in range hoods and to give the householder an indication when the filter is contaminated and should be replaced because the clean appearance of surface 26A will become discolored by the entrainment of grease particles in the pad.

In FIG. 9, a substrate $S_a$ comprises a perforated self-supporting sheet similar to those of U.S. Pat. No. 4,227,904. It is provided with perforations 70. The substrate is sprayed with adhesive as in spraying station 34 and odor-removing particles 22b are deposited thereon as in station 44 and excess particles are blown off the surface as by the air driver of FIG. 4 to provide a generally uniform layer of carbon particles approximately one particle thick. An overcoating of adhesive is then applied as by station 62 and the substrate then passed through the drying/curing station 74. Such substrate need not be subjected to the tolerance station 76 but may be removed from the end 80 for subsequent use.

The second or overcoat provided by station 62 enables such a substrate to retain the odor-removing media thereon and in this respect, the method herein disclosed represents an improvement on the method of making a filter disclosed in U.S. Pat. No. 4,227,904, wherein the substrate is coated by a roller coating technique. The second or overcoat disclosed herein makes it possible to lock the odor-removing particles on the substrate without resort to roller coating with the resulting product having a more uniform particulate loading without shedding.

Figure 12:
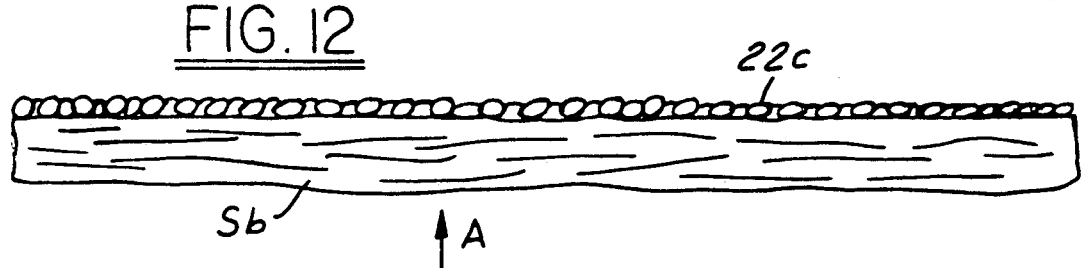
FIG. 12 is a cross-sectional view through a non-woven polyester pad having odor-removing particles adhered to but one face thereof.

FIG. 12 is a filter corresponding to that of FIG. 8 except that following deposit of the carbon particles and removal of the excess carbon, a second adhesive coating is sprayed over the carbon coated face of the substrate as in Station 62 to lock the carbon particles on the substrate. The filter is, of course, passed through the curing station. If desired, the substrate may be sized in thickness as by the roller 78. This substrate may be more dense than that of FIG. 8 where an increased pressure drop can be tolerated and greater particle filtering action is desired.

Figure 13:
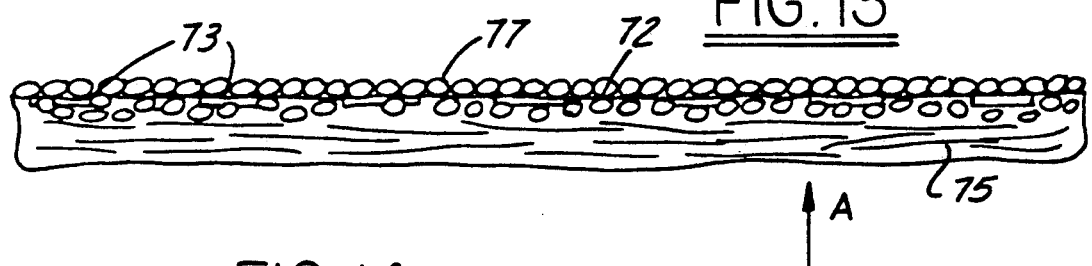
FIG. 13 is a modified form of "clean" filter; which also is an "indicator" filter manufactured according to the methods herein disclosed.

In FIG. 13 another type of "clean" filter is disclosed which is also an "indicator" filter, i.e., will indicate to the user when the filter has become loaded with grease and should be replaced. A light colored or white fibrous non-woven substrate $S_c$ is printed on one side 72 with an ink pattern such as disclosed in German Patent 27 08 435. This ink pattern may be printed on a face of the substrate in any suitable fashion. The ink itself should be of a color that contrasts with that of the substrate. It may be made up, for example, of 5 parts of grease soluble (water insoluble) organic dye stirred with 5–10 parts of a suitable emulsifier having the property of dispersing grease soluble but not water soluble dyes in water. Thereafter, 30 parts of a water soluble binder are stirred in until the mixture is homogeneous. The mixture is then treated with 55 parts water and printed on the substrate face 72. The non-woven substrate $S_c$ will function as a particle filter.

The substrate is then passed through the processing line shown in FIG. 1 with face 72 disposed upward and the face coated with a spray of the adhesive in station 34, then coated with odor-removing particles in Station 44 and then passed beneath the air driver shown in FIG. 4 to drive the odor removing media down into the substrate and also remove excess particles. A second or overcoating of adhesive is then applied in station 62 to the side 82 of the substrate to lock the odor-removing particles on the substrate. Following this the substrate is passed through the curing or drying oven in station 74. The substrate may then be optionally passed through the tolerance station 76 to size the thickness of the pad. The substrate is then mounted in a suitable frame with the media covered face 72 disposed downstream so that the normal air flow is in the direction of Arrow A and the exposed face 75 will be the one observed by the user. This type of filter is particularly desirable for use in range hoods. As the substrate $S_c$ becomes grease-laden, the ink 73 will migrate toward the surface 74 and when visible to the user will indicate that the substrate has become grease-loaded and the filter is ready to be replaced. Of course, the odor-removing particulate 77 will remove the odors from the air stream as it passes through the substrate.

Figure 14:
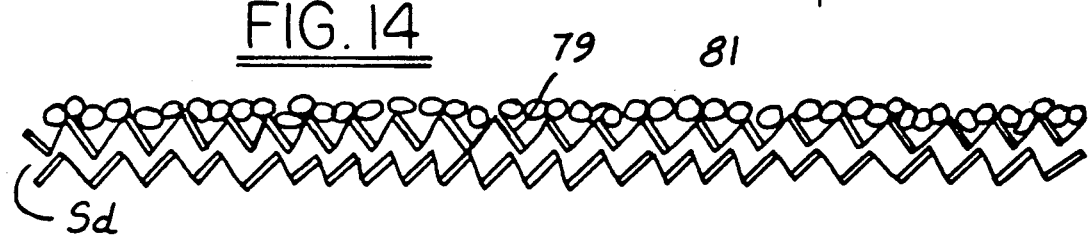
FIG. 14 is a cross-sectional view through an expanded metal substrate through which odor-removing particles have been adhered according to the methods herein taught.

FIG. 14 shows an expanded metal substrate $S_d$ on the face 79 of which has been adhesively secured a layer of odor-removing particulate 81. The substrate $S_d$ may be prepared by placing the substrate at the entry end of the processing line shown in FIG. 1 with the face 78 uppermost, and then sprayed with adhesive in the spraying station 34, the substrate then passed to station 44 where odor-removing particles are applied and then passed beneath the air driver of FIG. 4. The air pressure is adjusted to remove only enough particulate so that a uniform dense layer approximately one particle thick remains on the substrate surface as shown in FIG. 14. The substrate is then passed to station 62 where a second or over coat of adhesive is applied to lock the particles on the substrate. The substrate is then passed through station 74 to dry or cure the adhesive. In the case of this type of substrate, the rollers 78 and 78a are not utilized for sizing. The resultant substrate may be processed through the line once more to coat the opposite surface of the substrate in like fashion if desired. The substrate, thus prepared, may be mounted in a suitable frame for use as a filter.

The substrates of FIGS. 2–8 may be formed of polyester, nylon, polypropylene or glass fibers. Other fibers, either natural or man-made to meet the particular requirements of the intended use of the filters may be utilized. In addition, open cell polyurethane, or the like, reticulated foam may be utilized.

The adhesive to be used may be styrene acrylic latex, vinyl acetate, ethylene vinyl acetate, polyvinyl acetate, p.v.c. and acrylic latex, or other adhesives meeting the requirements for the use of the filter.

The odor-removing particles useful herein may be either activated carbon, activated aluminum impregnated with potassium permanganate, silica gel and the like. As used herein the term "odor-removing particles" is also intended to cover oxidizing materials such as manganese dioxide.

The scrim material shown in FIG. 7 may be spun bonded nylon or polypropylene, knitted polyester, or woven fiber of a variety of materials.

Examples of filters made utilizing the method disclosed herein are as follows:

EXAMPLE 1

(a) A ¼ inch nominal thickness polyester pad measuring 12 by 12 made of a 32 denier non-woven fiber with a density of 2 to 3 ounces per square yard was placed at the entry end of the processing line shown in FIG. 1 and passed through various steps as hereinafter detailed.

(b) In spraying station 34, the upwardly disposed face of the substrate was sprayed with an acrylic latex adhesive identified as UCAR 153, manufactured by Union Carbide Corporation having a viscosity of less than 500 cps. at 20'C. This adhesive was sprayed through a two-component spray head with the air at 40 to 60 psig and the adhesive at 30 to 55 psig at a distance of approximately 11 inches with the spray head, or heads, reciprocating across the pad. Between 20 and 30 grams of adhesive per square foot was thus applied.

(c) Following the spraying of the upwardly disposed face, the substrate was passed to station 44 where 20/50 U.S. mesh activated carbon particles in 30 to 60 activity was applied to the upwardly disposed adhesive sprayed face of the mat at the rate of between 30 to 55 grams per square foot. A suitable carbon granule for this purpose is made by Sorbtech, Inc. of Woodlands, Tex. Following application of the activated carbon, the substrate was passed beneath an air driver as in FIG. 4 where air jets are directed downwardly at the substrate of sufficient force to drive the activated carbon particles down into the substrate and at the same time blow off the excess particles. For this purpose the air pipe 56 may be of a 1 inch inside diameter with air holes of 5/32 inch diameter spaced ½ inch apart and with an air pressure of 60 psig. The pipe is spaced 1½ inches above the substrate.

(d) Following the air driver, the substrate was passed to the station 62 where a second or overcoat spray was applied at the rate of 2 to 10 grams per square foot of the same adhesive as was applied in station 34. The adhesive was sprayed using a spray head and at pressures similar to those described in sub-paragraph (b) at a distance of approximately 11/12 inches. The second coat bridged the particles and also bridged between particles and fibers so that upon curing the adhesive the particles are quite securely locked in the mat.

(e) The substrate was then passed through the curing station 74 where it was raised to a temperature of 200° to 350° F. for a period of approximately 2 minutes.

During this interval the water content of the adhesive was evaporated out. Following the oven, the filled substrate was passed through a sizing station similar to station 76 to size the thickness of the mat. Thereafter the filled substrate was mounted in a suitable frame for use as a filter.

EXAMPLE 2

(a) A filter was made according to the process described in Example 1, except after passing out of the curing oven in station 74, the substrate was re-entered in the processing line with its opposite or uncoated face disposed upper-most and each of the steps thereafter repeated on the upwardly disposed face of the substrate. The pressure of the air driver on both passages through the processing line was selected so that the carbon particles were driven substantially half way through the substrate with the result that the final product had the activated carbon distributed substantially uniformly through the entire thickness of the substrate.

EXAMPLE 3

(a) A one-half inch nominal thickness, non-woven polyester pad measuring approximately 12×18 and made of 200 denier fiber with a density of between 4 and 9 ounces per square yard was entered at the upstream end of the processing line of FIG. 1.

(b) In station 34, the adhesive corresponding to that mentioned in Example 1 was applied to give a wet loading of approximately 25 grams per square foot.

(c) At station 44 activated carbon measuring 6/12 U.S. mesh of 50 to 65 activity was deposited at the rate of 160 grams per square foot. The substrate was then subjected to the action of the air driver as in subparagraph (c) of Example 1, to drive the carbon particles substantially half way through the thickness of the substrate.

(d) The substrate was then subjected to a second coat as in station 62 of 2 to 10 grams of adhesive per square foot of substrate.

(e) The substrate was then passed through the curing station 74 and following such was subjected to the sizing in the tolerance station 76 and its thickness (which has grown during processing) is reduced to 1-2.

EXAMPLE 4

(a) A substrate was made according to the process of Example 3 except no overcoat as in Station 62 was applied to the substrate. The finished product emerging from the curing station 74 was enclosed in a non-woven highly porous scrim envelope to prevent shedding. The scrim material found suitable for this purpose is manufactured by James River Corporation, and has a denier of 3.5 and a density of 0.4 ounces per square yard.

EXAMPLE 5

(a) A substrate was processed according to Example 3 but in lieu of the air driver of FIG. 4, a driver of the character shown in FIG. 10 was utilized. It was found that the resulting substrate, following cure and sizing in tolerance station 76 exhibited enhanced activated carbon granule retention upon shaking the substrate in an effort to dislodge the particles therefrom.

EXAMPLE 6

(a) A substrate was manufactured in accordance with Example 3, but in lieu of the air driver of FIG. 4, a particle driver of the character shown in FIG. 11 was utilized. In this instance carbon loading on the order of from 304 to 323 grams per square foot was achieved. Retention of the activated carbon particles in the substrate was very good as measured by shaking the substrate following curing and thickness sizing. For example, in checking several samples, between 0.85 and 1.74 grams of carbon were lost by the shaking.

Several further samples were made using the processing line illustrated in FIG. 1 to determine the amount of particulate that could be effectively filled and retained in a substrate and the data is tabulated below. In the table, the substrates measured (before filling) nominally 13" by 13" and were of original and final thicknesses as indicated. Original thickness refers to the nominal pad thickness prior to filling while the final thickness is that which it measured following squeezing in the tolerance station 76. The substrates being filled were non-woven of 200 denier polyester fiber and had a density of 4.4 ounces per square yard. All substrates were filled from both sides using activated carbon particles measuring 6/12 U.S. screen series. The series D samples were subjected to an overcoat on both sides in station 62. Each sample was cured twice once for each side after coating. For comparison purposes, it was calculated that a filled filter one inch thick would contain about 1135 grams per square foot and would have an average pressure drop thereacross of 1.0 inches water column at 200 fpm. The pressure drop measurement for the samples was taken by placing two of the sample layers together and passing air therethrough at 200 fpm.

The term "percent of volume loading" refers to the percentage by volume of carbon in the substrate after the loading. It is determined in accordance with the following formula:

$$(\text{Specific Volume of Carbon} : \text{Specific Volume of Substrate}) \times 100$$

The basis would be one square foot of substrate one-half inch thick. For example:

Carbon weights = 30 lbs/ft$^3$ or
1/30 lb/ft$^3$ = .0333 ft$^3$/lb specific volume
1/2" mat = 1/24 ft$^3$ or .0417 ft$^3$.
If .0333 ft$^3$ carbon is in .0417 ft$^3$ of mat =
.0333/.0417 = .799 or 79.9% by volume

| Sample: | A(1) | B(1) | C(1) | D(1) |
| --- | --- | --- | --- | --- |
| Original Thickness Nom. in. | ½ | ½ | ½ | ½ |
| Pad, Dry Wgt. gms. | 14.10 | 14.05 | 3.44 | 14.45 |
| Adhesive Wgt. gms. | 42.84 | 51.24 | 55.55 | 65.78 |
| Activated Carbon, net gms* 6/12 U.S. Mesh (granular) | 270.62 | 300.67 | 313.18 | 314.96 |
| Shake loss gms. | 2.18 | 0.54 | 1.60 | 0.14 |
| Finished thickness before compression in. | ½ | ½ | ½ | ½ |
| % Vol. loading before compression, %(4) | 38.4 | 42.6 | 44.5 | 44.7 |
| Finished thickness after compression in.(2) | 7/16 | 7/16 | 7/16 | 7/16 |
| % Vol. loading | 54.4 | 60.5 | 63.1 | 63.4 |

-continued

| Sample: | A(1) | B(1) | C(1) | D(1) |
|---|---|---|---|---|
| after compression, %(5,2) | | | | |
| Pressure drop @ 200 fpm, in H2O(6) | .13 | .15 | .16 | .15 |
| Pressure drop @ 200 fpm, in H2O(7,2) | .16 | .17 | .22 | .20 |
| Pressure drop of 1" thick (nom) filled filter at 200 fpm | 1.0 | 1.0 | 1.0 | 1.0 |

*After deducting carbon lost from shaking
(1)A, B, C, and D are averages of 4 samples each.
(2)Averages of A (3&4), B (3&4), C (3&4), and D (3&4) only, and sized
(3)A Samples made with air driver only. B. Samples rolled after air driver. C. Samples rolled before air driver. D. Samples rolled after air driver, and overcoated.
(4)Based on 1" thickness before compression
(5)Based on 7/16" thickness before compression.
(6)2 layers in 1" frame before compression.
(7)2 layers in 1" frame after compression.

From the foregoing chart, it may be determined that with the driver of the type shown in FIG. 4, it was possible to suspend the equivalent of about 48 percent of the activated carbon in the substrate as compared with the carbon weight of a filled filter of the same thickness. Where the substrate was filled using the driver of FIG. 10, approximately 53 percent of the carbon, by weight, could be suspended in the substrate as compared with the carbon in a comparable size filled filter. Finally, in a substrate which was filled using the driver of FIG. 11, approximately 55 percent of the carbon weight of a filled filter could be suspended in the substrate. At the same time, the table shows that the pressure drop across the samples was between 13 percent and 22 percent of the pressure drop of a comparable filled filter Utilizing the substrate filling techniques above-described, a substrate was made up using a pad of non-woven polyester with a denier of 30 and a density of 3.6 ounces per square yard and filled with 20/50 (U.S. Mesh) activated carbon particles. Only one side of the substrate was filled with carbon and an overcoat was provided to insure locking of the carbon on the substrate. This resulted in a filter substrate which would be satisfactory for domestic range hood use. The amount of carbon can be controlled quite accurately by regulating the blow-off provided by the filling step. The filling may be accomplished by utilizing the driver of FIG. 4. This product will provide quite an efficient filter because of the small size carbon grains being used.

A relationship exists between the effectiveness of the overcoat in station 62 in locking the particles in place and the density and denier of the substrate itself. As the particle size of the media increases, the overcoat provided in station 62 becomes less effective to hold the particles in place. If sufficient adhesive is applied to retain the larger particles the adhesive tends to coat the surface of the activated carbon particles so that the carbon is less effective to absorb odors. The capacity of the carbon may not be reduced but the efficiency is diminished by the overcoat.

In those instances where a substrate is filled at both sides to provide the maximum loading of the substrate with the odor-removing media, the filter is normally intended for a commercial/industrial use and in this instance, high-efficiency is generally required. Therefore, in those instances, an overcoat may not be desired because the efficiency of the filter is to be maintained at the highest level. In such cases the filter substrate may be enclosed in the scrim envelope shown in FIG. 7.

Thus, it has been determined that with large activated carbon particles such as 4/6 U.S. Mesh on a high denier mat such as 250 to 300 denier, or more, and where high efficiency is desired, an overcoat as provided by station 62 may not be desired. However, with high carbon loading (100 grams to 500 grams per square foot) the overcoat provided by station 62 may enable the manufacture of the filter without the use of the scrim envelope as shown in FIG. 7.

The second or overcoat provided by station 62 is desirable when it is intended to effect better particle-to-particle or particle to substrate bonding and to minimize shedding or defoliation of the carbon particles. The overcoat may be particularly beneficial a) where there is a small denier mat with small mesh carbon, i.e., 20/50 (U.S. Mesh); b) where there is an essentially impervious substrate with larger carbon particles such as 6/12 (U.S. Mesh); or c) where a high carbon loading is intended (such as 100 grams to 500 grams per square foot), and it is desired to avoid the use of the scrim cover as in FIG. 7.

It has also been found that the overcoat provided by station 62 in FIG. 1 is particularly useful where the carbon or odor removing media are no longer regularly shaped, but are irregular in configuration. In such instance the irregular configuration appears to lend itself well to the particle to particle or particle to fiber bonding or particle to substrate surface bonding provided by the overcoat of station 62.

As indicated above, it has also been found that improved adhesive bonding between the odor-removing particles and the substrate is effected without the overcoat where the driving techniques of either FIG. 10 or FIG. 11 is utilized, i.e., where the carbon or odor-removing particles are worked in the substrate by the rollers.

In FIG. 16 a modified form of the method for producing the odor removing substrate of FIGS. 5-8 is disclosed. In this method, instead of spraying the substrate to apply the adhesive as in station 34 of FIG. 1, the substrate S' is passed through a roll coating station 34' having a roll coater 100 of conventional construction as in U.S. Pat. No. 4,227,904, to which adhesive may be fed from an adhesive reservoir 102. It has been found that a suitable adhesive for this type application is a styrene butadiene synthetic latex and may be purchased from Chemical Technology Inc, Detroit, Mich., grade #CTI-2004.

It has been found that by roll coating the substrate S' instead of spraying it, the same adhesive loading may be achieved with less than 50% or more of the adhesive used in spraying. In addition, the problems of handling and disposing of the water pollution which occurred in the water trough 36 of FIG. 1 are completely eliminated, air pollution is essentially eliminated and as a result potential health hazards are avoided.

It has been found that the roll coating serves to work the adhesive down into the substrate through the squeezing action of the rollers against the upper and lower surfaces of the substrate whereby the adhesive penetrates the substrate more effectively than where the adhesive is applied by spraying. It has been found that by adjusting the vertical distance between the rollers to squeeze more or less the substrate, penetration of the adhesive into the substrate may be varied from merely a surface coating (where little squeezing is effected) to penetration down to about the center of the substrate (where greater squeezing is effected). If it is desired to impregnate the substrate with adhesive completely therethrough, it is necessary to roll coat both sides of the adhesive as hereinafter mentioned.

From the roll coater the substrate S' is deposited on a conveyer 104 upon which it passes to the particulate filling station 44' beneath the hopper 46' containing the particulate media to be loaded into the substrate. The hopper corresponds to that shown at 46 in FIG. 1. The substrate, after moving beneath the hopper and having the particulate media deposited thereon, may optionally move beneath particulate driver means 54' shown in FIGS. 1 and 4 for driving the particulate down into the substrate where such is desired. Alternatively the drivers of either FIGS. 10 or 11 may be used as desired.

It has been found that the combination of roll coating the adhesive on the substrate S' and the working of the particulate against the adhesive in the substrate by the drivers of FIGS. 4, 10 or 11 results in a substrate that will retain the particulate media very effectivley without the need for a second adhesive coating as in station 62 of FIG. 1. Accordingly, filters made using roll coating of the substrate and the particulate drivers of FIGS. 4, 10 or 11 do not require any overcoating.

From the filing station the substrate moves to a conveyer 110 disposed in the drying station and passes beneath a drying means 112 which, unlike the curing station 74 of FIG. 1 may comprise a manifold with downwardly directed orifices therein to which heated air is fed so that the heated air is applied downwardly evenly across the upwardly facing surface of the particulate coated substrate. It is intended that the adhesive be cured at this point sufficiently so that it may be handled without contaminating the handler. It may not be completely cured at this point. The adhesive will continue to cure at room temperature following the drying station until completely cured. Downstream of the drying station is a tolerance station similar to that shown and described at 76 in FIG. 1.

In FIG. 17 there is shown a filter assembly 120 utilizing a substrate 132 manufactured as disclosed in FIG. 16. The filter assembly includes a frame 122 formed of paper, metal or other material providing some rigidity to the assembly. The frame comprises an encircling U-shaped channel 124, (see FIG. 18) connected across opposite faces of the filter by cross members 126 and 128. Within the frame is a sandwich filter comprising a ⅜" prefilter substrate 130 which comprises a 40 denier, non-woven polyester fiber mat. Juxtaposed against the prefilter is a ⅜" substrate made on the processing line of FIG. 16 and comprising a 40 denier non-woven fibrous mat substrate 132 which has been filled with activated carbon particles such as 6/16 U.S. mesh in 30 to 60 activity at the rate of anywhere from 100–300 grams per square foot. The mat was filled from both sides, i.e, the substrate was run through the line of FIG. 16 twice, first with one face uppermost and then inverted with the opposite face uppermost. Juxtaposing the lower face of the filled mat is an expanded metal screen 134 to give added rigidity to the structure, and beneath that is a reticulated foam layer 136 for catching any carbon particles tending to shed from the assembly. In use, air flow is indicated by the arrow in FIG. 18. This structure provides a low pressure drop filter. If a greater pressure drop can be tolerated, as by increasing the width or number of the cross members 126 and 128, the expanded metal screen 134 may be eliminated.

In FIG. 19, a prefilter pad 130' similar to that shown in FIG. 18 is provided on top of a particulate loaded substrate 132' and surrounding the bottom face and edges of the substrate 132' is a reticulated foam layer 136' which is secured, as by adhesive at the sides 138 to the edges of the prefilter layer 130'. In the FIG. 19 structure the assembly is generally flexible and shedding of carbon particles from substrate 132' is prevented on one face by the prefilter 130' and on the other face and at the edges by the reticulated foam 136'. The filter of FIG. 19 would be placed in a suitable supporting structure during air treating use.

In the FIG. 20 arrangement a prefilter pad of 40 denier material indicated at 130" is coated on one side with particulate carbon and the coated face 140 of the pad is covered by a reticulated foam layer 136" which is carried up around the edges and adhesively secured to such edges of the substrate 130". Thus, that face of pad 130" bearing carbon particles is covered by the reticulated foam to prevent shedding. The substrate 130" shown in FIG. 20 is desirably manufactured on the line shown in FIG. 16 where but one side of the pad is coated. This type filter may be on the order of 1" in thickness or conceivably less and would be normally placed in a supporting frame for use in a filtering process.

It is to be understood that FIGS. 19 and 20 are simply cross-sections through the edge of filter structures made according to this invention and as described above.

What is claimed is:

1. The method of making an odor removing thin bed filter comprising the steps of:
    supporting an air permeable substrate having pores or voids therein in a generally horizontal position;
    applying adhesive to the upwardly disposed face of the substrate and down into the substrate;
    depositing particles of an odor removing media in a layer several particles deep on the upwardly disposed face of the substrate;
    physically pressing the deposited media down into the substrate while physically working it into the pores or voids and against the adhesive therein to distribute the media over the surface and down into the substrate below the surface of the substrate and effect contact with the adhesive and with surfaces of the pores or voids within the substrate; and
    curing the adhesive on the substrate to lock the media therein.

2. The invention defined by claim 1 wherein the adhesive is applied to the substrate by either spraying or roll coating.

3. The invention defined by claim 1 or 2 wherein the media is pressed downwardly into the substrate by passing a roller over the upwardly facing surface of the substrate arranged to press and work the media down into the substrate.

4. The invention defined by claim 1 or 2 wherein following the pressing of the media downwardly into the substrate and prior to curing, again applying adhesive to the upwardly disposed face of the substrate.

5. The invention defined by claim 4 wherein an air jet is directed against the upwardly facing surface of the substrate prior to curing the adhesive to remove excess media therefrom.

6. The invention defined by claim 1 or 2 wherein an air jet is directed downwardly against the upwardly disposed face of the substrate to press the media downwardly into the substrate.

7. The invention defined by claim 6 wherein an air jet is directed at the odor removing media deposited on the upwardly facing surface of the substrate to press the media into the substrate and blow off excess media on the upwardly facing surface.

8. The invention defined by claim 1 wherein the adhesive is cured with heat and following curing of the adhesive, and while the adhesive is still warm, pressing downwardly against the upwardly facing surface of the substrate to size the thickness of the substrate.

9. The invention defined by claim 1 or 2 wherein following curing of the adhesive the substrate is encased within an air permeable envelope for retaining odor removing media which may become loosened from the substrate.

10. The invention defined by claim 1 wherein following curing of the adhesive the substrate is inverted to dispose the other face upwardly and the method is repeated.

11. The invention defined by claim 1 wherein the substrate is placed on a conveyor with one face disposed upwardly and is moved through the several steps on the conveyor.

12. The invention defined by claim 1, wherein the odor-removing media particles have a size sufficiently small to be received within the interstices of the substrate and sufficiently large not to percolate directly through the substrate.

13. The invention of claim 12 wherein the pressing of the media is sufficient to distribute the media substantially uniformly through the thickness of the substrate.

14. The invention defined by claim 12 wherein the pressing of the media into the substrate is sufficient to distribute the media throughout about one-half the thickness of the substrate.

15. The invention defined by claim 1 or 2 wherein the substrate comprises a non-woven web and the particles are pressed into the web by directing an air stream against the particles lying on the upwardly facing surface.

16. The invention defined by claim 1 or 2 wherein the substrate comprises a non-woven web and the particles are pressed into the web by passing a roller over the web arranged to engage and press the media down into the substrate.

17. The invention defined by claim 1 or 2 wherein the substrate comprises a woven mat of small denier strands and excess particles are removed from the mat by directing an air jet against the particles on the mat.

18. The invention defined by claim 3 wherein just prior to passing a roller over the upwardly facing surface of the substrate, an air jet is directed at the surface of the substrate to remove excess particles on the substrate and drive particles down into the substrate.

19. The invention defined by claim 3 wherein immediately following passing of the roller over the upwardly facing surface of the substrate, and prior to curing of the adhesive, an air jet is directed against the surface of the substrate to blow off excess particles thereon.

20. The invention defined by claim 3 wherein following pressing of the media into the substrate and prior to curing the adhesive, excess media is blown off the upwardly disposed face of the substrate.

21. The invention defined by claim 20 wherein following blowing of excess media off the substrate and prior to curing the adhesive, again applying adhesive to the upwardly disposed face of the substrate.

22. The invention defined by claim 3 wherein following deposit of particles of odor-removing media on the substrate, blowing excess media off the substrate and thereafter pressing the media into the substrate and again apply adhesive to the upwardly disposed face of the substrate.

23. The method of making an odor-removing thin bed filter comprising the steps of:
supporting an air-permeable substrate having pores or voids therein in a generally horizontal position;
applying adhesive to the upwardly disposed face of the substrate;
depositing particles of an odor removing media in a layer several particles deep on the upwardly disposed face of the substrate;
directing an air jet against the upwardly disposed face of the substrate and against the media to drive the media down into the pores or voids and also to remove excess media from the surface of the substrate;
again applying adhesive to the upwardly disposed face of the substrate; and
curing adhesive on the substrate to lock the media on the substrate.

24. The invention defined by claim 23 wherein the adhesive is applied to the substrate by spraying.

* * * * *